Feb. 10, 1931.  W. H. ROBERTSON  1,791,905
CASH REGISTER
Filed July 26, 1924   3 Sheets-Sheet 1

Inventor
William H. Robertson
By
His Attorneys

Feb. 10, 1931. W. H. ROBERTSON 1,791,905
CASH REGISTER
Filed July 26, 1924 3 Sheets-Sheet 2
FIG. 4
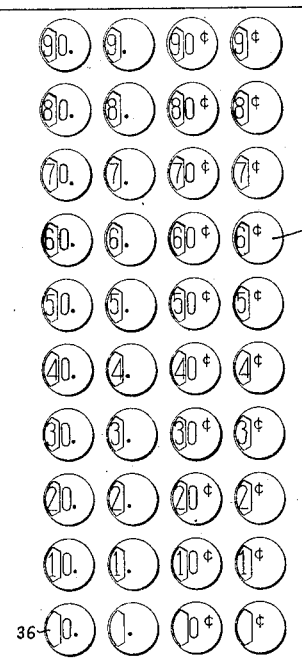
FIG. 5
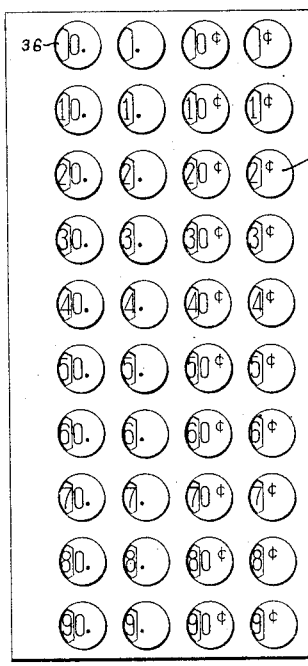
FIG. 6
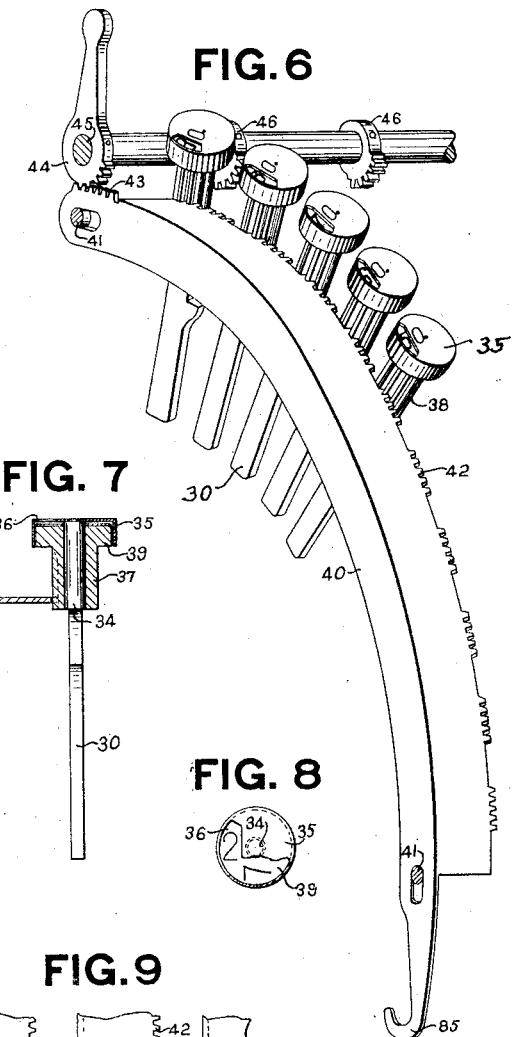
FIG. 7
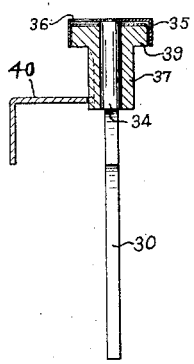
FIG. 8
FIG. 9
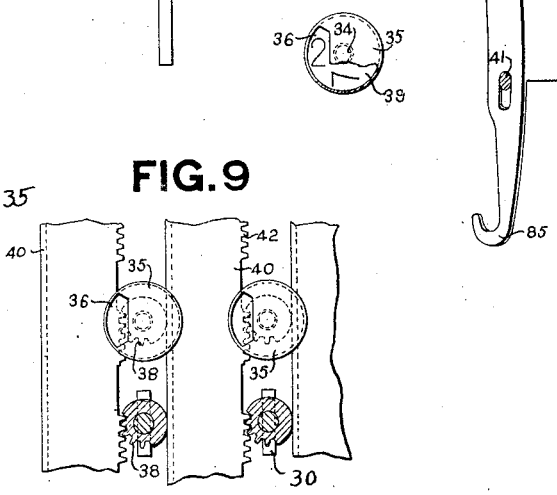
Inventor
William H. Robertson
By Pearl Benst
Henry E Stauffer
His Attorneys Feb. 10, 1931.  W. H. ROBERTSON  1,791,905
CASH REGISTER
Filed July 26, 1924  3 Sheets-Sheet 3

Inventor
William H. Robertson
By
His Attorneys

Patented Feb. 10, 1931

1,791,905

UNITED STATES PATENT OFFICE

WILLIAM H. ROBERTSON, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed July 26, 1924. Serial No. 728,434.

This invention relates to cash registers, and more particularly to means for effecting subtraction in such machines.

One object of this invention is to provide a simple and efficient means for effecting subtraction from the totalizers of cash registers by adding the complement of the amount to be subtracted.

Another object of the invention is to provide means for automatically adding "1" to the sum of the minuend and the complement of the subtrahend in order to obtain the correct result.

Still another object of the invention is to provide mechanism for automatically rocking out all of the zero stop pawls when subtraction is to be effected by the adding of the complement.

Another object is to simultaneously change the captions on all keys of the keyboard so that when the subtrahend is set up, the keys corresponding to its complement will be depressed.

With these and incidental objects in view, the invention includes certain novel features of construction and combinations of parts, the essential elements of which are set forth in appended claims and a preferred form or embodiment of which is hereinafter described with reference to the drawings which accompany and form part of this specification.

Of said figures:

Fig. 4 is a diagrammatic view of the keyboard with the key captions set in their normal adding positions.

Fig. 5 is a diagrammatic view of the keyboard with the numbers on the key captions reversed as they appear in subtracting operations.

Fig. 6 is a detail enlarged perspective view of a portion of one of the banks of amount keys, and shows the mechanism for changing the captions.

Fig. 7 shows one of the keys partly in section, together with a sectional view of the segmental rack for changing the key captions.

Fig. 8 is a detail top plan view of one of the amount keys with a portion of the cover thereof broken away to show the two digits and the relative positions they occupy on each of the keys.

Fig. 9 is a detail plan view of a portion of the keyboard showing the means for changing the key captions.

General description

Figure 1:
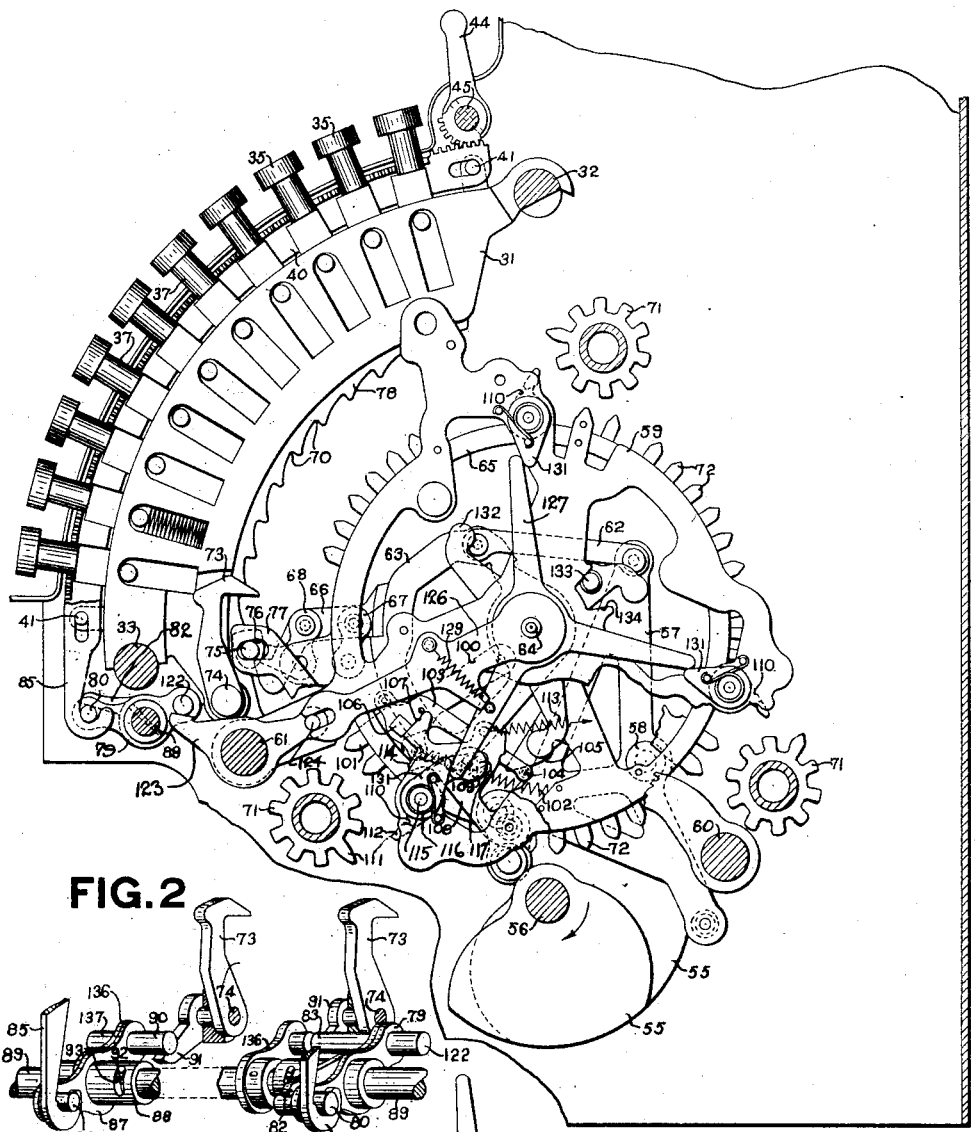
Fig. 1 is a sectional view through the machine taken just to the right of the first bank of amount keys.
Figure 2:
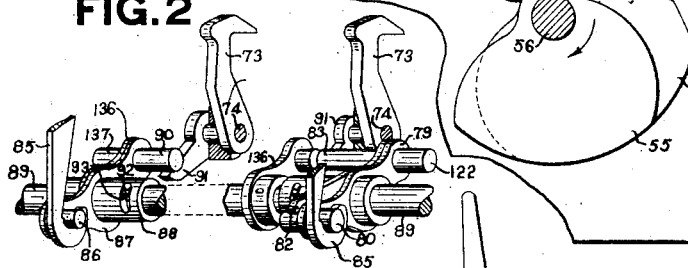
Fig. 2 is a detail perspective view of two of the zero stop pawls, and the mechanism for rocking them to their ineffective positions when subtraction is to be effected.

This invention is shown embodied in a machine of the type described and illustrated in the patents to F. L. Fuller No. 1,242,170 and 1,394,256 dated October 9, 1917 and October 18, 1921, respectively, and also the patent to Bernis M. Shipley, No. 1,619,796, dated March 1, 1927. Only such parts of this machine as are pertinent to a description of the present invention have been shown in this application and, if any further description is desired with regard to the parts of the machine not shown herein, reference may be made to the above mentioned patents.

There are known to the art several methods of effecting subtraction on totalizers. The method followed in the present invention is that known as subtraction by the addition of complements. In the decimal system, where the digits run from "0" to "9", the complement of any digit in respect to nine is the difference between that digit and "9", and the subtraction of one number from another may be effected by adding the complement of the subtrahend to the minuend and adding 1 to the remainder.

In the machine to which the present invention is applied, there are three lines of totalizers provided. These totalizer lines each carry a plurality of totalizer elements and the totalizers can be selected under the control of the keyboard by sliding the totalizer lines endwise, and then the selected totalizer may be engaged with the actuating mechanism by means which is very well known in the art.

When an amount is to be added, the amount is set up on the keyboard and, upon the operation of the machine, this amount is added to the selected totalizer by a well known differential mechanism. When it is desired to subtract a number from the amount standing upon a particular totalizer, a manipulative means is operated which causes the digits of the key captions of the amount banks to be reversed, that is the zeros which were previously at the bottom of the keyboard will now appear at the top, while the nines which were previously at the top will be at the bottom; the numerals of the captions of the other keys of the keyboard being likewise reversed. It is evident from the above that if the subtrahend is now set up on the keyboard, and the machine operated, instead of the amount set up being added, the complement of this amount will automatically be added to the amount on the selected totalizer. The result of this computation will be the result of the subtraction of the subtrahend from the minuend minus one in the units column, which is lost on every subtracting operation. Means are, therefore, provided on such subtracting operations for tripping the transfer mechanism for the units bank which, as the machine operates, will add one additional unit to the amount set up and thereby give the correct result on the totalizer.

Means are also provided for rocking out all of the zero stop pawls on subtracting operations, because the differential mechanism must move up to the "9" position in order to register the correct complement in any bank in which no key was depressed.

Keyboard

Figure 10:
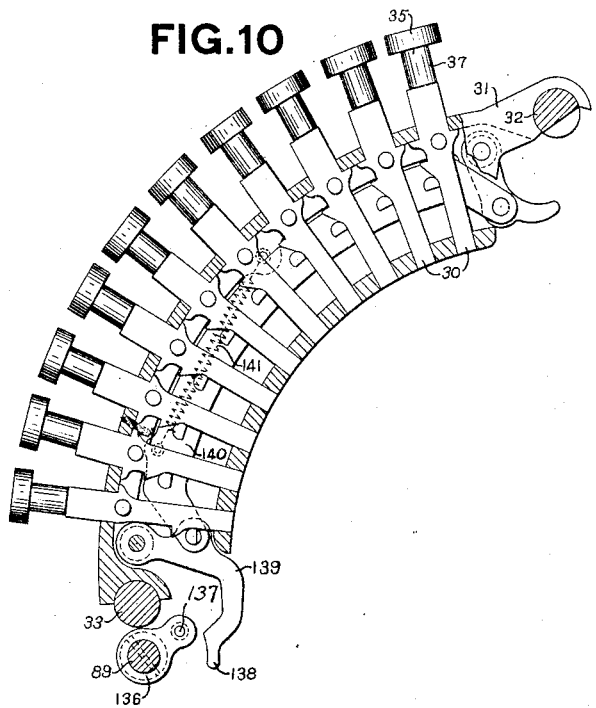
Fig. 10 is a detail side elevation of one of the amount key banks.
Figure 11:
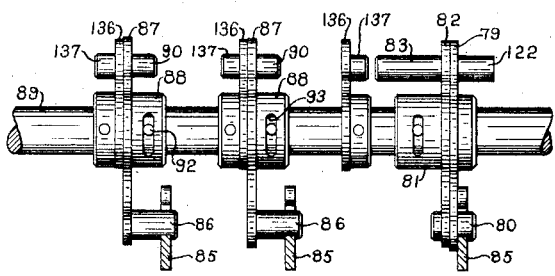
Fig. 11 is a detail top plan view of the arms and levers for rocking the zero stop pawls out of effective positions, locking out the keys on totalizing operations, and tripping the units transfer mechanism.

The machine illustrated herein is provided with four banks of amount keys. These keys are duplicates of one another with the exception of the zero keys and the description of one will therefore be sufficient for all. The keys are provided with key shanks 30, (Figs. 7 and 10) of conventional design, which are slidably mounted in key frames 31 supported at their upper and lower ends, respectively, by rods 32 and 33 (Fig. 1). As can be seen in Fig. 7, each of the keys at its upper end is formed with a cylinder 34, to the top of which a cap 35 is fastened. This cap, as can be seen in Figs. 4, 5, 6, 8 and 9, is provided with an opening 36. Surrounding the cylinder 34 of each key is a sleeve 37 which has teeth 38 (Figs. 6 and 9) formed thereon. At its upper end the sleeve 37 has a flange 39 on which two figures are engraved at an angle of 90° from each other (Fig. 8). In the example shown in this figure, the key, when the keyboard is used for adding, will have the figure "2" exposed through the opening 36 in the cap 35. When subtraction is to be accomplished, however, the sleeve 37 and the flange 39 thereof are rotated in a clockwise direction a one quarter turn by mechanism which will be hereinafter described, which movement will bring the digit "7" into position under the opening 36 formerly occupied by the digit "2". It is, of course, apparent that "7" is the complement of "2". In this way all of the ten keys of each bank in the keyboard are constructed so that when they are given the 90° rotation, above mentioned, the complement of the digit previously exposed on each key will be moved into view. The lowermost key in each bank (Figs. 7 and 10) has a slightly different shape due to the fact that the pin, with which its shoulder cooperates to hold it in depressed position, is in a different location on the detent. Its operation however is identically the same as the other keys.

The mechanism for automatically rotating all of the amount keys from their normal to their complementary positions will now be described. Adjacent each bank of keys is an angular segmental rack 40 slidably mounted on two pins 41 projecting from the machine frame. These racks 40 carry a plurality of sets of teeth 42 (Figs. 6 and 9) which mesh with the teeth formed on the sleeves 37. At its upper end, the rack 40, for the left hand bank of keys, carries a set of teeth 43 which mesh with teeth formed on a lever 44 fast on a shaft 45 supported by the machine frames. Also fast on this shaft 45, in position to cooperate with the racks 40 of each of the other banks of keys, is a segmental gear 46. Any desired number of banks of keys and racks 40 can be included in the machine without in any way departing from the spirit of the invention. The teeth 38 formed on the sleeves 37 are of sufficient length to permit the inward movement of the keys into their depressed positions without causing disengagement of the teeth 38 from the teeth 42 on the racks 40.

It is believed to be clear from the above description that when the lever 44 is rocked clockwise (Fig. 6) the racks 40 are moved upwardly, and, due to the engagement of the segmental gears 42 with the teeth 38, rotate the sleeves 37 and the flanges 39 to an extent of 90°, to bring the complements of the digits, previously exposed, into positions beneath the openings 36 in the caps 35. The subtrahend is then set up on the amount keys, using the digits as they now appear, and this depression of the keys, will in reality, automatically set up the complement of the subtrahend so that when the machine is operated such complement will be added to the minuend standing on the selected totalizer.

Differential mechanism

The differential mechanism of this machine is well known, and therefore, only a very brief description thereof will be included herein. There is a unit of the differential mechanism for each bank of amount keys. Each of these units is driven by a pair of cams 55 (Fig. 1) fast on a shaft 56, which is the main drive shaft of the machine, and which receives one complete clockwise rotation upon each operation of the machine. The cams 55 operate a Y-shaped lever 57, pivoted at 58 to a hanger or supporting frame 59, carried by rods 60 and 61 supported by the side frames of the machine. The Y-shaped lever 57 is given, first, a clockwise, and then a counter-clockwise movement upon each operation, and this movement is transmitted through a link 62 to a driving segment 63 pivoted on a stud 64 carried by the frames 59. A differentially movable actuator 65 is also pivoted on the stud 64 and is normally latched to the driving segment 63 by a latch 66 carried by a link 67 and a bell crank lever 68. As the differentially movable actuator 66 and the driving segment 63 move in a clockwise direction the forward end of the bell crank lever 68 strikes the inner end of whichever one of the keys has been depressed. This rocks the latch 66 toward the left far enough to become disengaged from the driving segment 63, and also far enough for the forward end of the latch 66 to come into engagement with whichever one of a plurality of notches 70, formed in a plate 78, may be opposite the latch at the point where it is disengaged. The driving segment 63 continues its movement in a clockwise direction to the end of its stroke, and then is returned in a counter-clockwise direction to its zero position. When it reaches the point at which the differentially movable actuator was disconnected therefrom, the latch will reengage the segment 63 and the mechanism will be returned to its normal position.

The machines of this class are usually provided with three lines of totalizers, each consisting of a plurality of totalizer wheels 71. These totalizer lines may be engaged separately or simultaneously with rack 72 carried by the differentially movable actuator 65. After the actuator 65 has reached the point at which its latch is disengaged the selected totalizers are moved into engagement with the rack 72 and held in such engagement until the mechanism reaches its normal position, so that the totalizer elements will be rotated to extents corresponding to the keys depressed.

On ordinary adding operations it is necessary to disengage the latches of the differential mechanism in the zero positions when no keys in the respective banks are depressed, and this is done by means of zero stop pawls 73 secured to short shafts 74 mounted in the key frames 31. The forward ends of the bell crank levers 68 carry laterally projecting pins 75 which extend through openings 76 in reset spiders 77, which are well known and of which only a part is shown in this application. These reset spiders move with the differentially movable actuators 65 and, in the banks in which no keys are depressed, they will contact with the zero stop pawls 73, appropriate thereto and cause the latches of their differential mechanisms to be disengaged in the zero positions.

When subtraction is to be effected, however, by the addition of the complement, it is not desirable to have the latches disengaged in the zero positions even though no keys are depressed. As the complement of "0" is "9", the differential mechanism must move to the "9" position, in order to properly complete the computation. In order to accomplish this function it is necessary to provide means for automatically rocking out all of the zero stop pawls whenever the subtraction lever 44 is moved to its subtracting position, and the means for accomplishing this function will now be described.

The racks 40, for each of the banks of amount keys, have downwardly extending hooks 85 (Figs. 1, 2, 6 and 11). These hooks, with the exception of the one for the units bank, each cooperate with a pin 86 carried by a lever 87 (Fig. 2) fast on a sleeve 88 surrounding a shaft 89 supported by the machine side frames. The opposite ends of the levers 87 carry pins 90 which normally lie just above a plurality of arms 91, one for each of the zero stop pawls 73 except that for the units bank. These arms 91 are fast on the shafts 74 above mentioned. Therefore, when the subtraction lever 44 is rocked counter-clockwise (Fig. 1) to its subtracting position, the racks 40 will be moved upwardly and the hooks 85 will rock the levers 87 clockwise, which will cause the pins 90 to contact with the arms 91 appropriate to each stop pawl and rock these stop pawls counter-clockwise to their ineffective positions.

As described in the above mentioned patents, it is also necessary, in machines of this type, to rock the zero stop pawls into their ineffective positions when a total is to be taken, and in this particular machine the mechanism for accomplishing this function has been slightly changed from that usually employed, and will now be described. The shaft 89 (Figs. 1 and 2) on totalizing operations, is given a clockwise movement when the total lever, which is not shown herein but which is shown and described in the above mentioned patents, is moved into one of its totalizing positions. The shaft 89 is then given a further clockwise movement upon the operation of the machine. The shaft 89 carries a plurality of pins 92 which project through slots 93 cut in the sleeves 88 which carry the levers 87. Therefore, when the shaft 89 is given its clockwise movement (Figs. 2 and 11), the pins 92 will engage the upper ends of the slots 93 and rock the sleeves 88 and levers 87 clockwise a sufficient distance to rock the arms 91, shafts 74, and stop pawls 73 to their ineffective positions.

The mechanism which cooperates with the units bank is slightly different in construction and will now be described. A lever 79 (Figs. 2, 3 and 11) similar to the levers 87 is loosely mounted on shaft 89 opposite the units bank and functions to trip the transfer in the units bank to add the fugitive "1", in the manner later described. The hook 85 for this bank cooperates with a pin 80 which extends from both sides of said lever 79. Fast on a hub 81, loosely mounted on shaft 89, is another lever 82, the forward end of which normally rests on the pin 80. At its rear end this lever carries a long pin 83 which cooperates with the arm 91 for the units bank and, through shaft 74, rocks the zero stop pawl out of operative position whenever the lever 44 is moved.

Since the lever 79 is used to trip the transfer units bank to add the "fugitive 1", it is not desired to have the lever 79 operated when the shaft 89 is rocked during totaling operations. It can be seen from Fig. 11 that the hub of lever 82 is connected with shaft 89 in the same manner as the hubs of the levers 87 for the other banks are connected with said shaft. It is clear that when this lever 82 is rocked clockwise (Fig. 1), by the shaft 89 the forward finger on the lever 82 is withdrawn from the pin 80, and therefore, the lever 79 will not be disturbed, but when the lever 79 is rocked clockwise the pin 80 presses against the finger on the lever 82 and rocks the lever 82 with it in clockwise direction to trip the transfer mechanism in the units bank.

Transfer mechanism

It is well known that when a set of totalizer wheels is operated by adding the complement (of 9), such as takes place in this machine, that is, to subtract by adding the complement, one unit is lost and it is therefore necessary in order to produce the correct result, to have mechanism which will automatically cause "1" to be added to the units column upon each operation where subtraction by addition takes place. In the present invention this unit is added by transfer mechanism provided in the units bank like the regular transfer mechanism, such as is common in machines of this type shown and described in the above named patents. Due to the fact that this mechanism is very well known it is believed that a brief description thereof will be sufficient herein.

The transfer mechanisms for the lines of totalizers are identical, and therefore, only one of these mechanisms is shown herein. Adjacent the actuating rack 72, (Fig. 1) for each of the totalizer lines, is a transfer arm 100 which carries two teeth 101, and which is pivoted to the differentially movable actuator 65. The transfer arm 100 is normally urged in a counter-clockwise direction by a spring 102. Pivoted to the transfer arm 100 is a lever 103 which has a pin 104 cooperating with a shoulder 105 on the differentially movable actuator 65. At the end of an operation there is a gap between the arm 100 and the rack 72. This gap varies in width, dependent upon whether a transfer has taken place or not. When the actuator 65 is rocked clockwise, the gap between the arm 100 and rack 72 is closed and the pin 104 moves behind the shoulder 105. As the actuator 65 is rocked counter-clockwise to its normal position, as above described, and a transfer has not taken place, then a square stud 106 on the lever 103 strikes the end 107 of a transfer lever 108, thus causing the arm 100 to stop. When this occurs, the pin 104 is rocked from behind the shoulder 105 to the position shown in Fig. 1.

When however, a transfer has taken place, as the differential actuator is rotated counter-clockwise, the lever 108 is rocked clockwise, by means to be later described, and the stud 106 then contacts a shoulder 114 of the lever 108 thus permitting the arm 100 to move one extra step to rotate its associated totalizer wheel 71 one extra step to turn in the carry. During this operation the pin 104 remains behind the shoulder 105 until the stud 106 contacts the shoulder 114, when the pin 104 is removed from behind the shoulder 105.

The means for controlling the position of the lever 108 is fully illustrated and described in the above mentioned patents, and briefly is as follows. An arm 109 connected to an arm 110 by a shaft 115 carried by the differential supporting frame 59, and normally tending to rock in a clockwise direction, due to a torsion spring 116 wrapped about the pivot pin of the arm 110, carries a pin 117 which cooperates with a cam edge formed in an opening in the lever 108. It is to be understood that the arm 110 shown in Fig. 1 cooperates with the units totalizer wheel and is connected to an arm 109 associated with the tens wheel which latter arm is of the same construction as that shown in Fig. 1. A small shoulder is formed in this opening in the lever 108 and normally holds the parts in the positions shown in Fig. 1. When a transfer is to be accomplished, a long tooth 111 of the totalizer wheel of next lower order strikes the end 112 of the arm 110 and rocks the arms 109 and 110 counter-clockwise a sufficient distance to dislodge the pin 117 from the small shoulder formed in the opening in lever 108, thereby permitting this lever to rock clockwise under the influence of a spring 113.

The above description is of the normal transfer mechanism as used in machines of the type to which the invention is shown applied. Every time a subtraction, by the addition of the complement, is to be made it is necessary to trip transfer arms 131 (Fig. 1) appropriate to each totalizer line in the units bank in order to add the one unit which will be lost in every subtracting operation. These arms are secured to the arms 109 and 110. The mechanism for tripping all three of the transfer arms 131 simultaneously will now be described.

The rack 40 for the units bank of amount keys carries the hook 85, which cooperates with the pin 80 carried by lever 79 loosely mounted on the shaft 89. This lever 79 also carries a pin 122 (Figs. 2, 3 and 11) which normally lies just above a flattened edge of a lever 123 loose on the rod 61. The lever 123 carries a pin 124 entering a notch 125 of an arm 126 loosely mounted on the stud 64. Also loose on the stud 64 is a three arm spider 127 which carries a pin 128 connected by a spring 129 to a pin projecting from the arm 126. The spring 129 normally holds the pin 128 in contact with a shoulder 130 of the arm 126. Each of the arms of the three armed spider 127 is adapted to cooperate with one of the inwardly projecting transfer arms 131 (Fig. 1) in the units bank. When the subtraction lever 44 is moved to its subtraction position, and the hook 85 for the units bank is moved upwardly, the lever 79 is rocked clockwise (Fig. 3), which rocks the lever 123 counter-clockwise and rocks the arm 126 clockwise about the stud 64. The spider 127 is also rocked clockwise due to the spring connection between the arm 126 and the spider. The movement of the spider in a clockwise direction is sufficient to rock the arms 131 and 109 far enough to remove the pins 117 carried by arms 109 from the shoulders in the openings in levers 108, thereby permitting the levers 108 to rock clockwise under spring action far enough to remove the ends 107 thereof from the path of the squared studs 106. Therefore, when the differentially movable actuator returns to normal, the transfer arm 100 will remain locked in alinement with the rack 72 until an additional unit is added to the units totalizer wheel.

Figure 3:
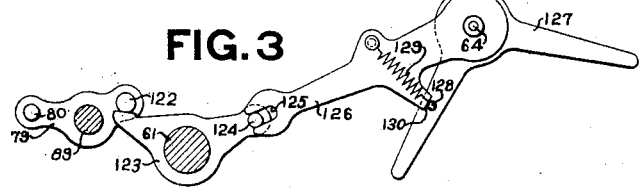
Fig. 3 is a detail side elevation of the means for tripping the transfer pawls on subtracting operations.

Near the beginning of each operation, the transfer trip arms are restored to their normal positions by a spider 132 pivoted on the stud 64. This spider is driven in a manner well known in the art and it will not, therefore, be described herein. However, it is sufficient to say here that in the machines of the type to which the present invention is shown applied, the spider 132 is rocked to restore the trip arms 131 to their normal positions before the totalizers are engaged with the actuators 72. Thus when the trip arm for the units bank is tripped by means of the lever 44 before the machine is operated, and thereafter the machine is operated, the spider 132 restores the trip arms 131. If no means were provided for again tripping the arms 131, the fugitive 1 would not be added into the units wheel during the subsequent completion of the operations of the machine. For this reason the flexible connection between the member 126 and the three-armed spider 127 is provided. When the spider 132 restores the trip arms 131, the spring 129 is tensioned, due to the fact that the arms 131 rock the three-armed spider 127 in a counter-clockwise direction (Figs. 1 and 3). However, as soon as the spider 132 is released in the manner well known in the art, the spring 129 again rocks the three-armed spider into the position in which the stud 128 again engages the shoulder 130. This movement causes the trip arms 131 to be again tripped and upon subsequent completion of the operation of the machine, after the totalizer has been engaged with the actuators, the fugitive 1 is added into the units wheel. If the subtraction lever is left in its subtraction position, the transfer trip arms 110 for the units bank will be immediately tripped again, as the spring 129 is stronger than the torsion springs 116 which hold the arms 110 in their normal positions.

*Means for locking out keys on totalizing operations*

When a total is to be taken it is essential that all of the keys be locked in their undepressed positions, and the means whereby this is done are as follows: It will be recalled that the shaft 89 is rocked clockwise (Fig. 10) whenever the total lever is moved. Fast on this shaft appropriate to each of the banks of amount keys is an arm 136 (Figs. 2, 10 and 11) which carries a pin 137 adapted to cooperate with a tail 138 of an arm 139. This arm supports the lower end of the latching detent 140 which, when the keys are depressed retains them in such positions. This detent is flexibly held in its normal position by a spring 141. When the shaft 89 is rocked by the total lever the pins 137 on arms 136 are moved into the path of the tails 138, thereby preventing any movement of the keys until the total lever is returned to its normal adding position.

*Operation*

It is thought that the operation of this machine can be best illustrated by a concrete example, for instance, if it is desired to subtract 1,254 from 5,426, it can be seen that the result will be 4,172. In order to accomplish this subtraction, however, the minuend, which is 5,426, is first set up on the keyboard, with the subtraction lever in the adding position, and the machine operated, thereby entering the amount 5,426 upon the selected totalizer. The subtraction lever 44 is then moved to its subtraction poistion, which rotates the keys a quarter turn and brings the complementary keyboard into view. The amount of the subtrahend, 1,254, will then be set up on the complementary keyboard, and the machine will be operated. In reality the amount set up on the keyboard when the keys 1, 2, 5 and 4 were depressed was 8,745, which upon the operation was added to the minuend 5,426, giving a result of 4,171, the digit of highest order passing off the totalizer. The transfer trip levers have, however, been automatically tripped by moving the subtraction lever to its subtraction position and, therefore, an additional unit will be added to the result of the above computation, giving the final amount standing upon the totalizer as 4,172, which is the correct result.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. The combination of a depressible rotatably mounted indicia bearing key member, gear teeth thereon, and a rack meshing with said teeth in depressed and undepressed positions of said key member.

2. The combination of a bank of depressible individually rotatably mounted indicia bearing key members, and means for rotating all of said members simultaneously and in either direction.

3. The combination of a bank of depressible rotatably mounted indicia bearing members, a gear on each member, a rack associated with all gears, and means for moving said rack to rotate all the members simultaneously and in either direction.

4. In a cash register, the combination of a bank of depressible keys each comprising a key stem, a rotatable member carried thereby and having longitudinal teeth formed thereon, and a rack adapted to cooperate with the rotatable members of all of the keys in a bank and simultaneously change the positions of adjustment of said members out of their normal positions and back again.

5. In a cash register, the combination of depressible keys each comprising a key stem, a rotatable member carried thereby and having longitudinal teeth formed thereon, a segmental rack adapted to cooperate with all the rotatable members of the keys to change the positions of adjustment of said members, and a manipulative means for operating said rack to move the members simultaneously out of their normal positions and back again.

6. The combination of depressible rotatably mounted indicia bearing members, a gear on each member, a rack for all gears, a gear member meshing with said rack, a shaft supporting said gear member, and means for oscillating said shaft.

7. The combination of a keyboard including amount keys each key bearing complementary numbers one of which is exposed while the other is concealed, and a single manipulative means for selectively exposing and concealing either set of numbers.

8. The combination of a bank of keys each bearing complementary numbers either of which may be in a position to designate said key, a differential controlled by said keys, a zero stop member for the differential, and means for changing the designation of said keys and for moving said zero stop member to ineffective position.

9. The combination of a bank of keys each bearing complementary numbers either of which may be in a position to designate said key, a differential controlled by said keys, a zero stop member for the differential, and a slidable member cooperating with said keys and zero stop member for changing the designation of said keys and for moving the zero stop member to ineffective position.

10. The combination of a bank of keys each comprising a rotatable portion to effect a designation of the complement, a differential controlled thereby, a zero stop member for the differential, a slidable member positioned alongside of said bank, intermeshing elements on said rotatable portions of said keys and on said slidable member, a connection between said slidable member and said zero stop member, and means for moving said slidable member to rotate said keys and to move said zero stop member to ineffective position.

11. In a machine of the class described involving a keyboard including a bank of amount keys, a differential controlled thereby, a zero stop member therefor, and means for changing the indicia on the keys to designate the complementary keys by the number to which they are complementary, for moving the zero stop member to ineffective position, and for effecting the entry of one unit in addition to the amount set up on said bank.

12. In a machine of the class described, the combination of a totalizer normally disengaged from its actuators, transfer devices for the totalizer, means for tripping the transfer device for the units bank, and restoring means for said unit transfer device operable to restore said units transfer device before the totalizer is engaged with its actuators, said restoring means being adapted to again trip the units transfer device immediately after it is restored and before the totalizer engages its actuators.

13. In a machine of the class described; the combination of a totalizer normally disengaged from its actuator; transfer means for the totalizer element of lowest denomination; means to trip the transfer mechanism prior to the engagement of the totalizer with its actuator; and means to actuate the transfer means to add "1" after the totalizer engages its actuator.

14. In a machine of the class described; the combination of a totalizer normally disengaged from its actuator; transfer means for the totalizer element of lowest denomination, including a normally restrained transfer segment operable separately from the actuator; means to release the transfer segment prior to the engagement of the totalizer with its actuator; and means to actuate the transfer segment to add "1" after the totalizer engages its actuator.

15. In a machine of the class described; the combination of a totalizer normally disengaged from its actuator; transfer means for the totalizer element of lowest denomination, including a normally restrained transfer segment operable separately from the actuator; a manually settable device, operable prior to an operation of the machine, to release the transfer segment; and means to actuate the transfer segment to add "1" after the totalizer engages its actuator during an operation of the machine.

16. In a machine of the class described; the combination of a totalizer normally disengaged from its actuator; transfer means for the totalizer element of lowest denomination, including a normally restrained transfer segment operable separately from the actuator; a manually settable device, operable prior to an operation of the machine; means controlled by said device to release the transfer segment; and means to restore the transfer segment to and maintain it in its restrained position until the totalizer engages the actuator, and then release the transfer segment to the action of the means controlled by said device after the totalizer becomes engaged with its actuator, to add "1" into the totalizer element of lowest denomination.

17. In a machine of the class described, the combination of a totalizer normally disengaged from its actuator; transfer means for the totalizer element of lowest denomination, including a normally restrained transfer segment operable separately from the actuator; a manually settable device; connections between the settable device and the transfer segment, including a slidable rack, pivoted means actuated by the rack, and a restraining arm operable by the pivoted means to release the transfer segment prior to an operation of the machine; and means to actuate the transfer segment to add "1" during a subsequent operation of the machine.

18. In a machine of the class described, the combination of a bank of keys bearing designating numerals corresponding to the digits registered upon depression of the respective keys, an actuator controlled by the keys, a zero stop member for the actuator, and means to change the designating numerals of said keys so that depression of a key corresponding to an amount will control the actuator to register the complement of such amount, such means also adapted to shift the zero stop member to ineffective position.

19. In a machine of the class described, the combination of a bank of keys bearing designating numerals corresponding to the digits registered upon depression of the respective keys, an actuator controlled by the keys, a zero stop member for the actuator, transfer mechanism, and means to change the designating numerals of said keys so that the depression of a key corresponding to an amount will control the actuator to register the complement of such amount, such means also adapted to shift the zero stop member to ineffective position, and for tripping the transfer mechanism of the units bank.

In testimony whereof I affix my signature.

WILLIAM H. ROBERTSON.